United States Patent [19]

Burrage

[11] Patent Number: 4,525,813
[45] Date of Patent: Jun. 25, 1985

[54] ARMORED UMBILICAL APPARATUS FOR TOWING A MARINE SEISMIC AIR GUN SUB-ARRAY

[76] Inventor: Eric C. Burrage, P.O. Box 581, Pearland, Tex. 77581

[21] Appl. No.: 342,510

[22] Filed: Jan. 21, 1982

[51] Int. Cl.³ .............................................. G01V 1/38
[52] U.S. Cl. ...................................... 367/20; 367/144; 174/47; 174/101.5; 181/110; 181/120
[58] Field of Search ........................ 367/20, 16, 17, 19, 367/106, 144, 177, 130; 181/110, 111, 118, 119; 114/245, 253; 174/47, 101.5

[56] References Cited

U.S. PATENT DOCUMENTS 2,416,561  2/1947  Albin ..................................... 174/47
4,038,630  7/1977  Chelminski .......................... 181/111

Primary Examiner—Nelson Moskowitz
Assistant Examiner—Ian Lobo
Attorney, Agent, or Firm—Bernard A. Reiter

[57] ABSTRACT

An armored umbilical and termination housing is disclosed for towing a sub-array of seismic air guns used in marine seismic surveying comprising a single air hose for supplying all the high pressure air to the individual air guns surrounded by all the electrical control cables needed to operate the air guns in the sub-array. Protective coatings are applied around the electrical control cables and stress members for carrying the laod of towing the sub-array are incorporated within the umbilical. A termination housing is provided on the end of the umbilical for terminating the single air hose and all the electrical control lines to common connectors so that individual electrical control lines and air hoses can run from the termination housing to each individual air gun in the sub-array. Air shut off valves are provided so that the high pressure air can be shut off to the individual air guns within the sub-array remotely from the survey vessel.

7 Claims, 13 Drawing Figures

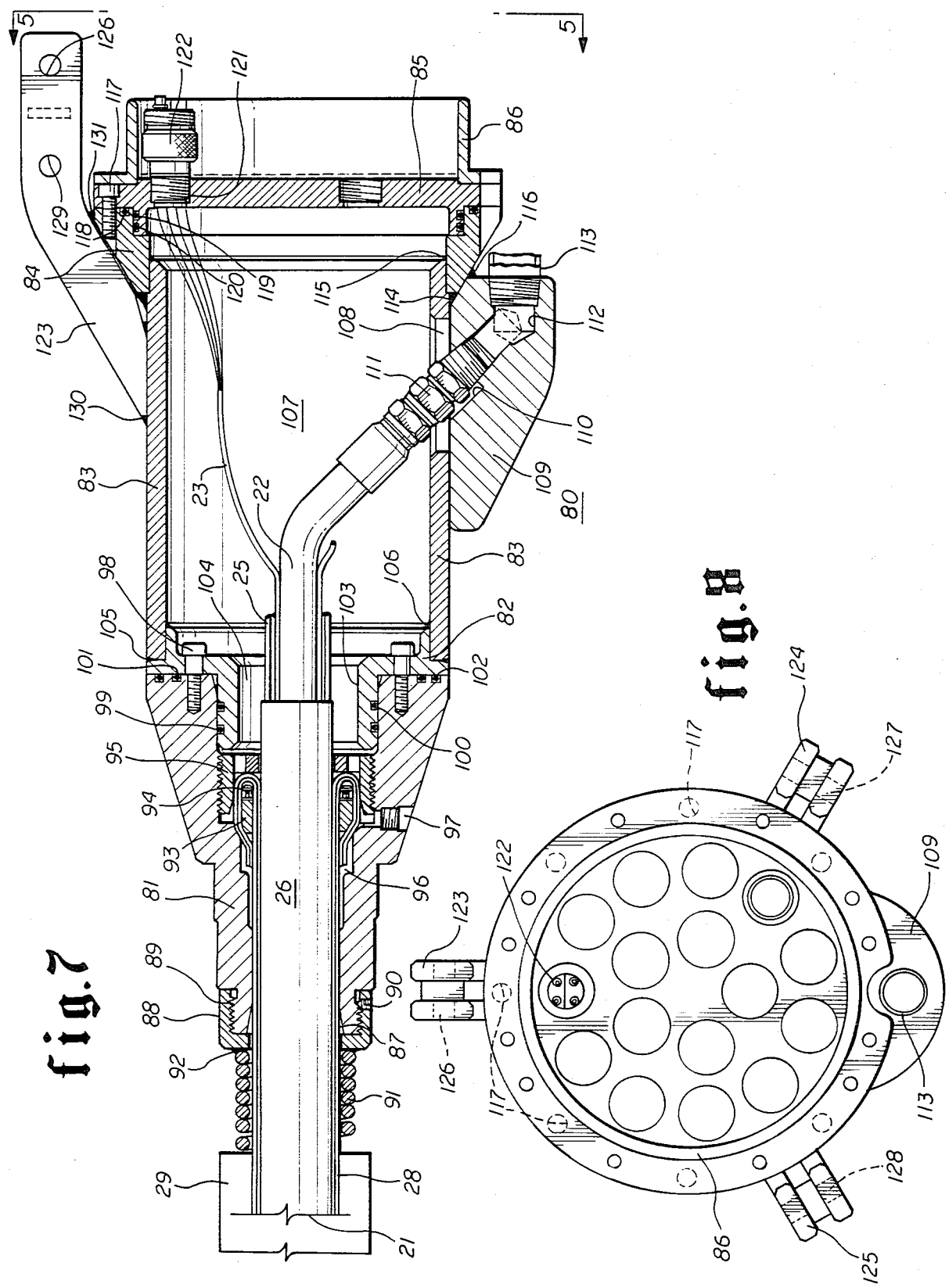

ARMORED UMBILICAL APPARATUS FOR TOWING A MARINE SEISMIC AIR GUN SUB-ARRAY

BACKGROUND OF THE INVENTION

This invention relates to marine seismic surveying by the use of an array of seismic air guns and more particularly to a towing armored umbilical for towing a sub-array of air guns from a survey vessel incorporating within the towing umbilical the high pressure air and the electrical control cables needed to operate the air guns making up the sub-array.

In seismic surveying in a medium such as water acoustic energy is generated by air guns sumberged in the water and is utilized to investigate subsurface geological conditions. For this purpose one or more of such air guns are submerged in the water and compressed air under pressure is fed to the submerged guns and temporarily stored therein. At the desired instant, the seismic source air guns are activated and fired thus abruptly releasing the pressurized air into the surrounding water. In this manner, powerful acoustic waves are generated capable of penetrating deeply into the subsurface materials of the earth to be reflected and refracted therein by the various strata and formations. These reflected or refracted acoustical waves are sensed and recorded to provide information and data about the geological conditions and formations.

Until recent times the air gun array was comprised of one or two sub-arrays towed behind the survey vessel forming the marine seismic source. It has become recently desirable, in poor marine seismic recording areas, to discriminate against unwanted reflection signals by forming a large array pattern of air guns in the water. The use of a large array in marine seismic surveying offers more directional control over the outgoing seismic energy and therefore can improve the recorded seismic data. This method of distributing the energy source over a large area to improve the directionality of the outgoing energy wave is known as pattern shooting and has been successfully used in land seismic surveying for the past thirty-five years. Usually the large array is formed by towing from the survey vessel a large number of individual sub-arrays consisting of a multiplicity of air guns. Paravanes are incorporated on the outside sub-arrays to help spread out the sub-arrays from behind the survey vessel, thus creating a large array of air guns.

With the need to tow large numbers of air gun sub-arrays in the water, it has become necessary to improve the towing means from the survey vessel to the sub-arrays. The present umbilicals used in the towing of sub-arrays are large and cumbersome and subject to damage from handling due to the lack of protection for the air supply lines and electrical control lines. The general method used today to tow air gun sub-arrays and to supply the air and electrical control lines to the air guns is to use a single steel wire rope as the tow line and a bundle of individual air hose lines and electrical cables bundled together to form the umbilical. This method results in an umbilical of large diameter with no protection to the air hoses and electrical cables from damage due to constant handling problems encountered in towing large numbers of sub-arrays in rough seas. A high percentage of air gun failure are due to air hose failures outside of the air gun.

A towing umbilical having a large outside diameter presents an additional problem when the type of array used necessitates that a number of sub-arrays be towed out on paravanes to extreme distances from the side of the survey vessel. When these sub-arrays are spread out behind the surveying vessel, the drag on each large diameter umbilical as it is towed sideways through the water, works in opposition to the action of the paravane and therefore limits the distance that the arrays can be offset from the towing vessel.

With the need for sub-arrays to be towed at increasing distances from the side of the survey vessel, it has become necessary that the towing umbilicals be of a small diameter to reduce the drag on the umbilicals but still retain the functional ability to tow the array and still supply the high pressure air and electrical control signals to the individual air guns within the sub-array.

SUMMARY OF THE INVENTION

To protect the air hoses and electrical cables from the survey vessel to the air guns from damage and to decrease the diameter of the towing umbilical so as to allow the sub-arrays to speed out to greater distances behind the survey vessel, an armored umbilical apparatus for towing marine seismic air gun sub-arrays is disclosed comprising a single umbilical towing line with a termination housing on its end. A single air hose runs through the center of the umbilical to supply all the high pressure air for all the air guns in the sub-array with individual electrical control cables for all the individual air guns secured around this central air hose. A protective coating of polyurethane encases the electrical control cables. A stress member such as steel armor wire or Kelvar rope or braid is then wrapped around the polyurethane wall of the umbilical line which serves as the means to tow the air gun sub-array. A flotation jacket of polyethylene foam can be extruded around the stress members to provide extra flotation for the umbilical if desired. The umbilical with its single air hose and all the electrical control cables terminates into a termination housing comprising a watertight compartment with a connector plate having watertight connectors for the electrical control cables for each individual air gun. Individual electrical control cables then run from each individual watertight connector to their respective air gun. High pressure air must still reach each individual air gun. This is accomplished by terminating the single air hose into a high pressure air manifold which is part of the termination housing. Mounted on the high pressure air manifold are individual electrically operated air shut off valves with individual air hoses running from each valve to their respective air gun. Electrical control cables run from watertight connectors in the connector plate to each shut off valve so that each valve can be remotely controlled from the survey vessel should a particular air gun lose its seal or a particular air line break. The termination housing of the armored umbilical also provides the mechanical connection of the umbilical to the sub-array assembly of air guns. Thus, the armored umbilical and its termination housing provides an extremely rugged towing umbilical of relatively small outside diameter thus reducing its drag in the water and having the means therein to supply all the high pressure air through a single air hose and also to supply all the electrical control cables to the individual air guns within the sub-array.

Other objects and advantages of this invention will become apparent from the following description taken

BRIEF DESCRIPTION OF THE DRAWINGS

FIG. 7 illustrates a cross sectional view of the umbilical termination housing according to the present invention.

FIG. 8 illustrates an end view of the umbilical termination housing taken along lines 5—5 in FIG. 4.

DESCRIPTION OF THE PREFERRED EMBODIMENT

Figure 1:
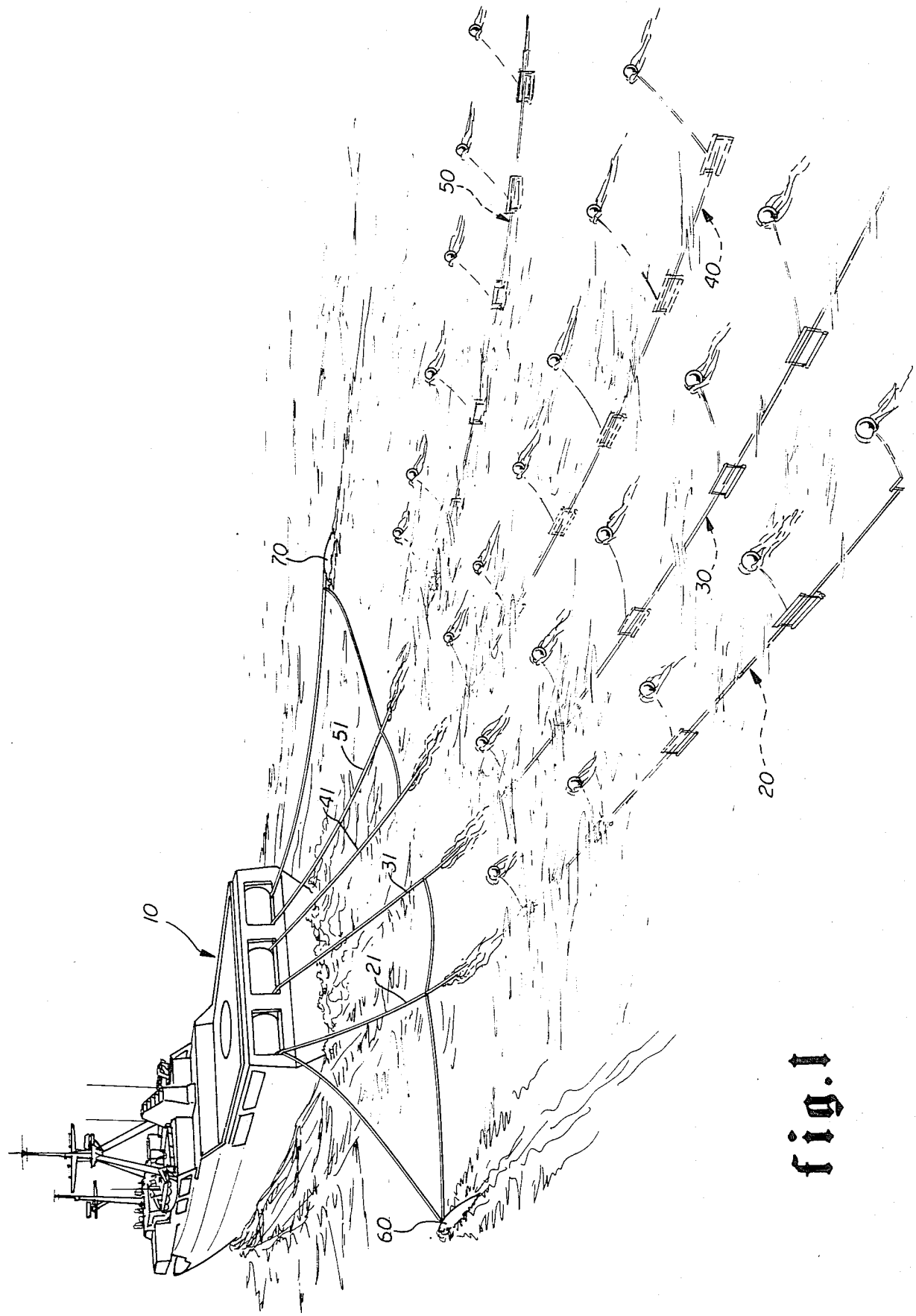
FIG. 1 illustrates a perspective view of a survey vessel towing an array of seismic air guns consisting of four sub-arrays.

Referring to FIG. 1, a survey vessel 10 is shown towing sub-arrays 20, 30, 40 and 50 of seismic air guns, with their respective towing umbilicals 21, 31, 41, and 51. To help spread the sub-arrays out behind the survey vessel 10, paravanes 60 and 70 are towed on the outside of the sub-arrays by separate towing means.

Figure 2:
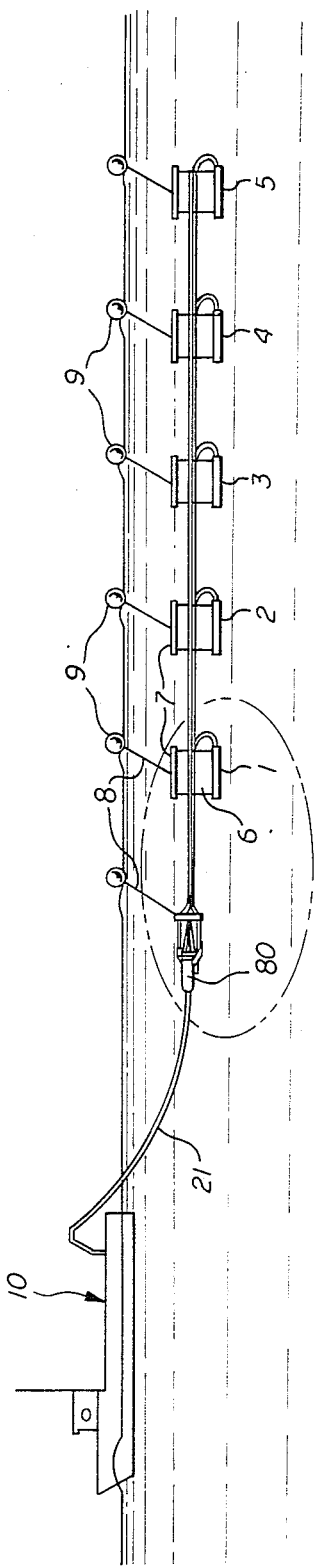
FIG. 2 illustrates a side view showing the survey vessel towing one typical sub-array of air guns.

FIG. 2 illustrates a side view of a typical marine seismic air gun sub-array. Towing umbilical 21 comes from the survey vessel 10 and terminates in a umbilical termination housing 80. Air guns 1, 2, 3, 4 and 5 are thus towed by the umbilical 21 and the umbilical termination housing 80. Air gun 1 is supported from a support plate 7 by chains 6. A float line 8 is connected to the support plate 7 and has a float 9 on the surface of the water to provide flotation to the air gun assembly. The other air guns in the sub-array are supported in a similar manner.

Figure 4:
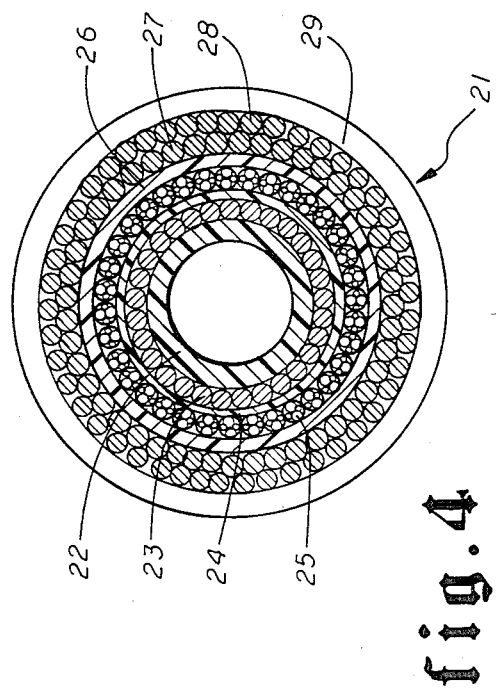
FIG. 4 illustrates a cross-sectional view of the towing umbilical taken along line 4—4 in FIG. 3.
Figure 3:
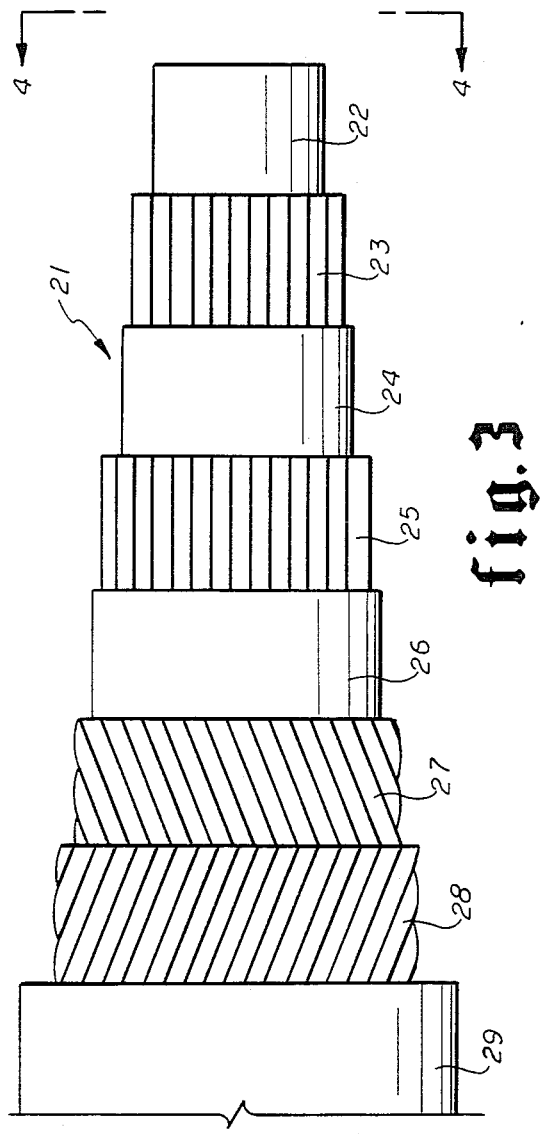
FIG. 3 illustrates the component parts of the towing umbilical according to the present invention.
Figure 13:
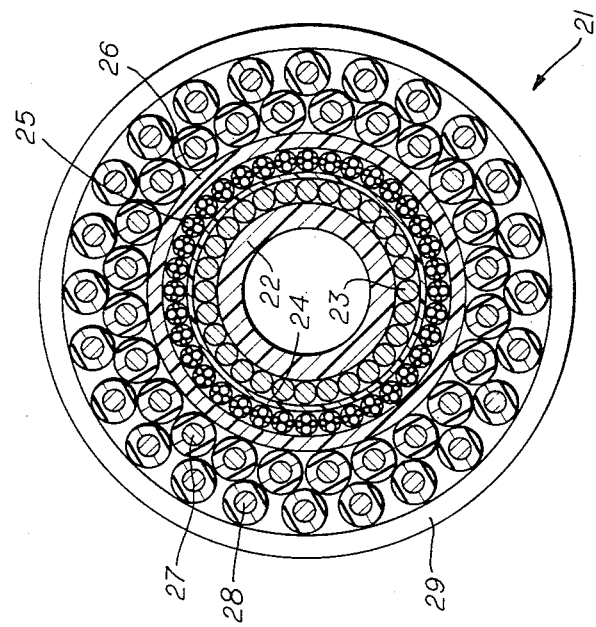
FIG. 13 illustrates a cross-sectional view of the towing umbilical shown in FIG. 12.
Figure 12:
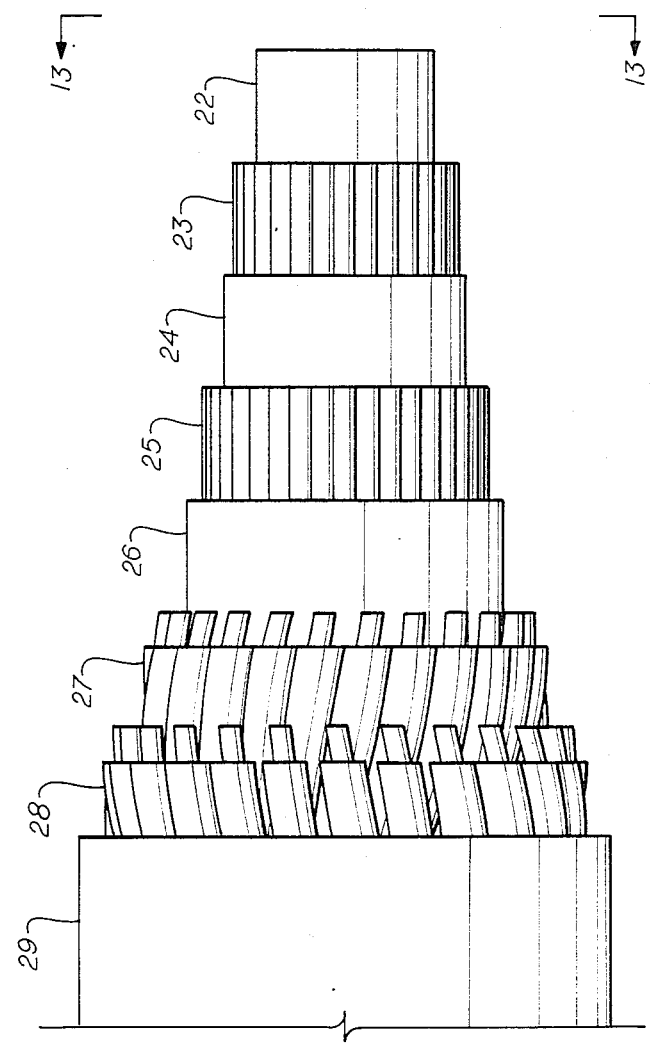
FIG. 12 illustrates the component parts of the towing umbilical according to another embodiment of the present invention.

Referring to FIGS. 3 and 4, the towing armored umbilical 21 comprises a central air hose 22 such as Dayco hose 12R8 surrounded by a first plurality of electrical control cables 23 which are in turn surrounded by a protective wrapping 24 such as metalized mylar tape which also acts as an electrostatic shield. A second plurality of electrical control cables 25 surrounds the protective wrapping 24 and is in turn surrounded by a first protective coating 26 such as a 0.200" thick coating of polyurethane. Spirally wrapped around the first protective coating 26 in a counter clockwise direction in a first stress mumber 27 such as a 0.090" diameter high tensil strength steel wire. Surrounding this first stress member 27 and spirally counter wrapped in a clockwise direction is a second stress member 28 such as another 0.090" diameter high tensil strength steel wire. It is not necessary that these stress members 27 and 28 be wrapped close together and be touching each other as illustrated in FIGS. 3 and 4 but can be spaced apart from each other by placing a high density plastic material such as polyethylene around each stress wire to a size of approximately twice the diameter of the stress wire as illustrated in FIGS. 12 and 13. This not only serves as a means to hold the stress wires apart during manufacture but also serves as a protective coating to the stress wires against salt water corrosion. This spacing would reduce the number of steel wires needed which would reduce the weight of the umbilical significantly. By using steel wires of high tensil strength on the order of 250,000 p.s.i., fifty percent of the stress wires could be eliminated without weakening the towing capacity of the umbilical. Flotation means 29, such as a flotation jacket made of polyethlene foam, is extruded over the second stress member 28 to reduce the weight of the umbilical 21.

Figure 6:
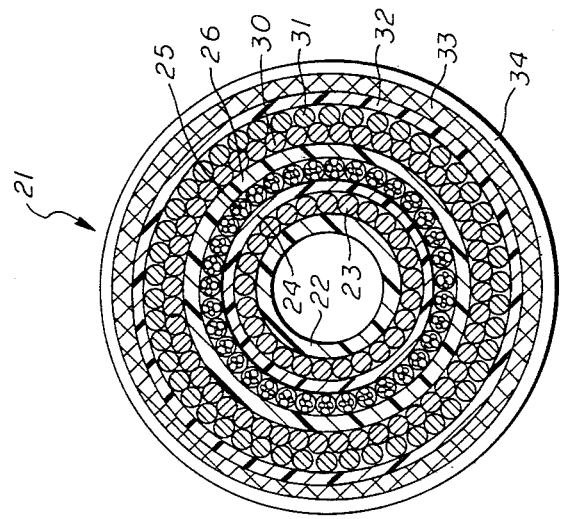
FIG. 6 illustrates a cross sectional view of the towing umbilical taken along lines 6—6 of FIG. 5.
Figure 5:
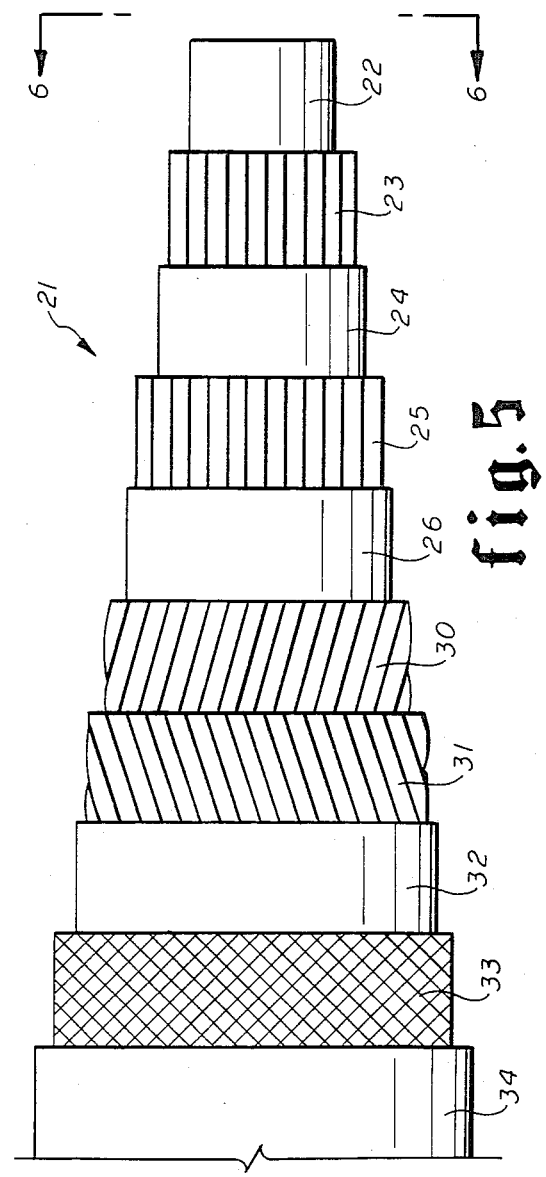
FIG. 5 illustrates the component parts of the towing umbilical according to a different embodiment.
Figure 9:
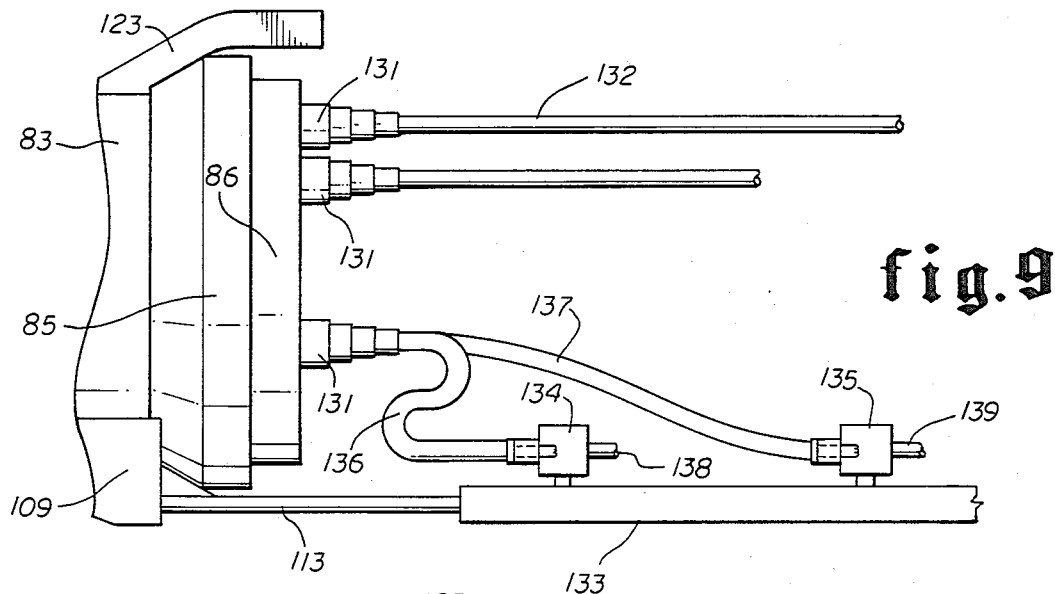
FIG. 9 illustrates a side rear view of the umbilical termination housing showing the electrical control cables leaving the umbilical termination housing.

FIGS. 5 and 6 illustrate another embodiment of the towing armored umbilical 21. The air hose 22 is surounded by the first plurality of electrical control cables 23 which in turn is surrounded by the protective wrapping 24. Again surrounding the protective wrapping 24 is the second plurality of electrical control cables 25 which in turn is surrounded by the first protective coating 26 such as a coating of polyurethane 0.100" thick. Surrounding the first protective coating 26 is a first sheath of woven braid 30 such as woven Kelvar rope or braid which is in turn surrounded by a second sheath of woven braid 31 such as woven Kelvar rope or braid. Surrounding the outside of the second sheath of woven braid 31 is a second protective coating 32 such as a coating of polyurethane 0.100" thick. Surrounding this second protective coating 32 is wrapped is third sheath of woven braid 33 such as 20G Copperweld steel braid. Surrounding this third sheath of woven braid 33 is a third protective coating 34 such as a coating of polyurethane 0.050" thick.

FIG. 7 illustrates the umbilical termination housing 80 which comprises a front termination housing 81, a front sealing plate 82, a central housing 83, a rear sealing plate 84 and a connector mounting plate 85 with an extending protective lip 86. The front termination housing 81 has a bore 87 to receive the umbilical 21. An end cap 88 is secured to the front termination housing 81 by threads 89 and set screw 90. A stiffening spring 91 is secured to the end cap 88 by welds 92 and extends along the outside of the umbilical 22 as the umbilical 21 enters the front termination housing 81. This stiffening spring 91 provides protection to the umbilical 21 to reduce flexing at the entry of the umbilical 21 into the front termination housing 81. The umbilical 21 extends the front termination housing 81 without the flotation jacket 29 surrounding it. The stress member 28 surrounding the umbilical 21 is wrapped around an inner locking ring 93 and rigidly held in place by set screw 94. A threaded outer locking ring 95 is threadably engaged into the front termination housing 81 and surrounds the stress member 28 and the inner locking ring 93. Outer locking ring 95 and inner locking ring 93 provide positive securing means to hold the umbilical 21 in the front termination housing 81. There is provided in the front termination housing 81 a cavity 96 and an epoxy filling port 97. An epoxy sealant such as 3M Company Type No. 8 is poured into the epoxy filling port 97 and runs into the cavity 96 and down the bore 87 thus providing against entry of water at the front of the housing. The front sealing plate 82 is secured to the front termination housing 81 by theaded bolts 98. O-rings 99, 100, 101 and 102 provide sealing means between the front termination housing 81 and the front seating plate 82. The front sealing plate 82 has a cental bore 103 defining a cavity 104 into which the umbilical 21 enters. The front sealing plate 82 is secured to the central housing 83 by welds 105 and 106. Central housing 83 has an inner watertight compartment 107 into which the air hose 22 and the electrical control cables 23 and 25 enter. Central housing 83 has a opening 108 in its side wall. Permanently attached to the central housing 83 is an air hose termination plate 109 having a cavity 110 disposed therein. Air hose 22 has a standard air hose cap 111 which threadably engages into the cavity 110 of the air hose termination plate 109. There is an additional bore 112 into which the air supply pipe 113 threadably engages. The rear sealing plate 84 is securely attached to the central housing 83 by welds 114 and 115. The rear sealing plate 84 is also securely attached to the air hose termination plate 109 by weld 116.

The connector mounting plate 85 is securely attached to the rear sealing plate 84 by threaded bolts 117. O-rings 118, 119 and 120 provide positive sealing means between the rear sealing plate 84 and the connector mounting plate 85. Threaded bores 121 are located in the connector mounting plate 85 to receive electrical watertight connectors 122. The extending protecive lip 86 of the connector mounting plate 85 surrounds the electrical watertight connectors 122 to provide protection to them. The electrical watertight connectors 122 can be any standard watertight connector but preferably a Reed Products RM-4 bulkhead underwater connector. The electrical control cables 23 connect to the electrical watertight connectors 122. The other electrical control cables 25 run to similar electrical watertight connectors not shown. Only one electrical watertight connection 122 is shown for illustration purposes. The connector mounting plate 85 can have as many electrical watertight connectors threadably engaged therein to necessitate the number of air guns used in the sub-array.

Securely attached to the central housing 83 are three towing brackets 123, 124 and 125. These towing brackets are securely attached to the central housing 83 by welds 130. The towing brackets 123, 124 and 125 have bores 126, 127 and 128 extending through them. These bores provide attachment means for the chain 11 (see FIG. 11.) The top towing bracket 123 has an additional bore 129 to receive the float line 8 which is attached to a float 9 to help provide flotation for the umbilical termination housing 80. All three towing brackets, 123, 124 and 125 securely attached to the central housing 83 by welds 130 and attached to the rear sealing plate 84 by welds.

FIG. 8 is an end view of the umbilical termination housing 80 taken along lines 5—5 of FIG. 4.

Figure 10:
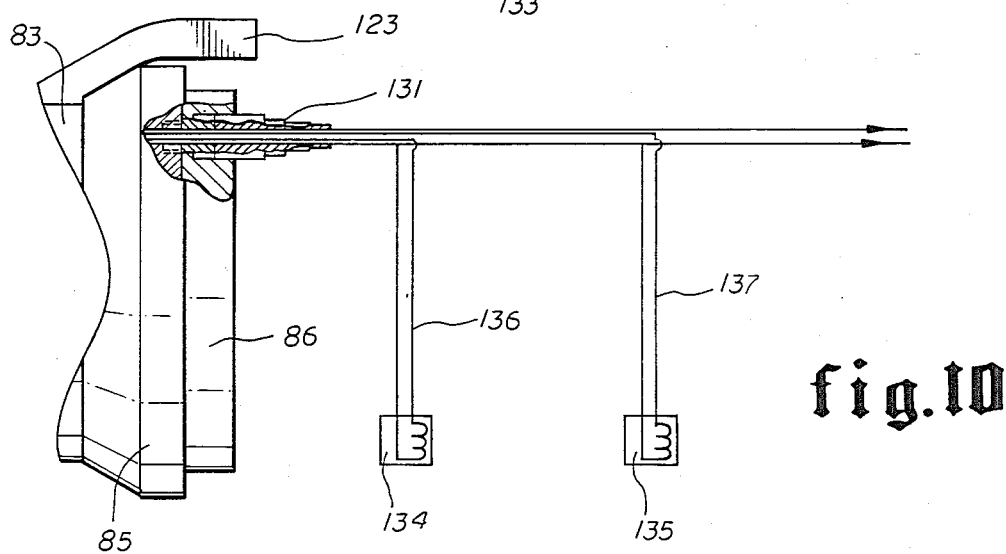
FIG. 10 illustrates an electrical schematic for the electrically operated shut off air valves.

FIG. 6 shows a side view of the back of the umbilical termination housing 80. Similar mating watertight electrical connectors 131 securely engage their corresponding electrical watertight connectors 122. Electrical control cables 132 extend from the watertight electrical connector 131 and run to their respective air guns. The air supply pipe 113 coming from the air hose termination plate 109 is securely attached to a high pressure air manifold 133. Mounted on the high pressure air manifold 133 are electrically operated shut off air valves 134 and 135 such as Type 962 manufactured by Teledyne Republic Manufacturing. Electrical control cables 136 and 137 run from the watertight connectors 131 to the respective electrically operated shut off air valves 134 and 135 respectively. This arrangement permits a separate indivdual air hose to run to each respective air gun from the high pressure air manifold 133 and permitting each respective individual air hose for each air gun to be individually controlled. FIG. 10 shows the typical electrical control cables that run to the air guns in the array and the electrically operated shut off air valves mounted on the high pressure air manifold 133 which will be typical to all air guns in the array.

FIG. 10 shows a typical electrical schematic for the electrical control cables 136 and 137 going to the electrically operated shut off air valves 134 and 135 for air guns 1 and 2.

Figure 11:
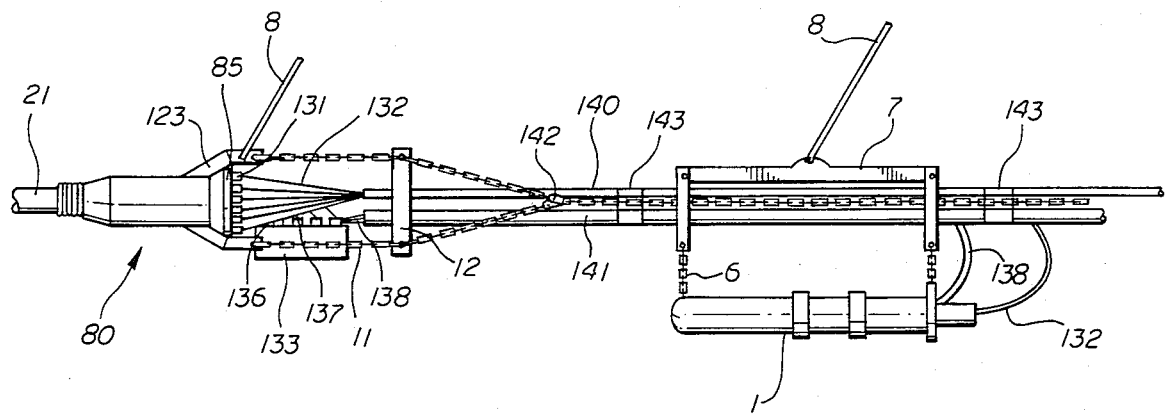
FIG. 11 illustrates a side perspective view showing a close up of the general arrangment.

FIG. 11 shows the overall mounting arrangement showing the umbilical 21 entering the umbilical termination housing 80. Individual electrical controls cables for each respective air gun, for example 132 and 138, exit the connector mounting plate 85 through electrical watertight connectors 131. These electrical control cables are wrapped together and run down the array in a bundle 40 and exit the bundle 140 at the location of the individual air gun. The individual air hoses leaving the high pressure air manifold 133 extend down the array wrapped in a bundle 141 and each individual air hose leaves the bundle at their respective air gun. Chains 11 connected to the towing brackets 123, 124 and 125 of the umbilical termination housing 80 are further supported by a circular chain towing harness 12 with the chains terminating at a common connector 142 and continuing down the array. The bundle 140 of electrical control cables and the bundle 141 of individual air gun hoses and the chain are wrapped together with wrapping means 143 such as strong adhesive waterproof tape.

While the invention has been described with reference to a preferred embodiment, it will be obvious to one skilled in the art that modifications and variations of the invention may be constructed and employed without departing from the scope of the invention. The scope of the invention is defined in the following claims.

I claim:

1. An armored umbilical apparatus for towing a subarray of a plurality of marine seismic air guns comprising:

a central air hose;

a first plurality of electrical control cables disposed concentrically around said central air hose;

a proctective wrapping disposed over said first plurality of electrical control cables;

a second plurality of electrical control cables disposed concentrically around said protective wrapping;

a first protective coating disposed over said second plurality of electrical control cables;

a first stress member spirally wrapped around said first protective coating;

a second stress member spirally wrapped around said first stress member;

flotation means disposed over said second stress member;

a termination housing attached to one end of said armored umbilical for receiving said central air hose and said first and second plurality of electrical control cables.

2. An armored umbilical apparatus for towing a sub-array of a plurality of marine seismic air guns in accordance with claim 1 wherein said temination housing comprises:
- a front termination housing having a central bore therein adapted to receive said armored umbilical;
- locking means within said central bore of said front termination housing to secure said umbilical therein;
- a front sealing plate securely attached to said front termination housing with said umbilical extending through said front sealing plate;
- a central housing securely attached to said front sealing plate having a water tight compartment therein for said umbilical to enter therein;
- an air hose termination plate securely attached to said central housing having a cavity therein to receive said air hose;
- a rear sealing plate securely attached to said central housing;
- a connector mounting plate securely attached to said rear sealing plate with a plurality of water tight electrical connectors securely mounted therein and adapted to receive said first and second plurality of electrical control cables;
- a high pressure air manifold securely attached to said air hose termination plate and having thereon a plurality of electrically operated air shut off valves;
- means for connecting said plurality of electrically operated air shut off valves to a selected number of said plurality of water tight electrical connectors in said connector plate;
- means for transmitting the high pressure air to each respective air gun in said sub-array from said plurality of electrically operated air shut off valves.

3. An armored umbilical apparatus for towing a sub-array of a plurality of marine seismic air guns comprising:
- a central air hose;
- a first plurality of electrical control cables disposed concentrically around said central air hose;
- a protective wrapping disposed over said first plurality of electrical control cables;
- a second plurality of electrical control cables disposed concentrically around said protective wrapping;
- a first protective coating disposed over said second pluarlity of electrical control cables;
- a first sheath of woven braid disposed around said first protective coating;
- a second sheath of woven braid disposed around said first sheath of woven braid;
- a second protective coating disposed over said second sheath of woven braid;
- a third sheath of woven braid disposed around said second protective coating;
- a third protective coating disposed over said third sheath of woven braid;
- a termination housing attached to one end of said armored umbilical.

4. An armored umbilical apparatus for towing a sub-array of a plurality of marine seismic air guns in accordance with claim 3 wherein said termination housing comprises:
- a front termination housing having a central bore therein adapted to receive said armored umbilical;
- locking means within said central bore of said front termination housing to secure said umbilical therein;
- a front sealing plate securely attached to said front sealing plate;
- a central housing securely attached to said front sealing plate having a water tight compartment therein for said umbilical to enter therein;
- an air hose termination plate securely attached to said central housing having a cavity therein to receive said air hose;
- a real sealing plate securely attached to said central housing;
- a connector mounting plate securely attached to said rear sealing plate with a plurality of water tight electrical connectors securely mounted therein and adapted to receive said first and second plurality of electrical control cables;
- a high pressure air manifold securely attached to said air hose termination plate and having mounted thereon a plurality of electrically operated air shut off valves;
- means for connecting said plurality of electrically operated air shut off valves to a selected number of said plurality of water tight electrical connectors in said connector plate;
- means for transmitting the high pressure air to each respective air gun in said sub-array from said plurality of electrically operated air shut off valves.

5. An armored umbilical apparatus for towing a sub-array of a plurality of marine seismic air guns comprising:
- a central air hose;
- a first plurality of electrical control cables disposed concentrically around said central air hose;
- a protective wrapping disposed around said first plurality of electrical control cables;
- a second plurality of electrical control cables disposed concentrically around said protective wrapping;
- a first protective coating disposed over said second plurality of electrical control cables;
- a first stress member comprised of a plurality of high tensile strength steel wires spirally wrapped around said first protective coating;
- a second stress member comprised of a plurality of high tensile strength steel wires spirally wrapped around said first stress member;
- flotation means disposed over said second stress member;
- a termination housing attached to one end of said armored umbilical for receiving said central air hose and said first and second plurality of electrical control cables.

6. An armored umbilical apparatus for towing a sub-array of a plurality of marine seismic air guns in accordance with claim 5 wherein:
- the tensile strength of each of said high tensile strength wires is on the order of 250,000 psi and each said wire is disposed within encasing means for spacing said steel wires apart from one another so that less wires are needed and the weight of said umbilical is reduced.

7. An armored umbilical apparatus for towing a sub-array of a plurality of marine seismic air guns in accordance with claim 6 wherein said termination housing comprises:

a front termination housing having a central bore therein adapted to receive said armored umbilical;

locking means within said central bore of said front termination housing to secure said umbilical therein;

a front sealing plate securely attached to said front termination housing with said umbilical extending through said front sealing plates;

a central housing securely attached to said front sealing plate having a water tight compartment therein for said umbilical to enter therein;

and air hose termination plate securely attached to said central housing having a cavity therein to receive said air hose;

a rear sealing plate securely attached to said central housing;

a connector mounting plate securely attached to said rear sealing plate with a plurality of water tight electrical connectors securely mounted therein and adapted to receive said first and second plurality of electrical control cables;

a high pressure air manifold securely attached to a said air hose termination plate and having thereon a plurality of electrically operated air shut off valves;

means for connecting said plurality of electrically operated shut off valves to a selected number of said plurality of water tight electrical connectors in said connector plate;

means for transmitting the high pressure air to each respective air gun in said sub-array from said plurality of electrically operated air shut off valves.

* * * * *